United States Patent
Zhi et al.

(10) Patent No.: US 10,176,936 B2
(45) Date of Patent: Jan. 8, 2019

(54) REPAIRABLE ELECTRICAL COMPONENT

(71) Applicant: City University of Hong Kong, Kowloon (HK)

(72) Inventors: Chunyi Zhi, Kowloon (HK); Yang Huang, Kowloon (HK); Yan Huang, Shek Kip Mei (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 0 days.

(21) Appl. No.: 15/635,702

(22) Filed: Jun. 28, 2017

(65) Prior Publication Data
US 2017/0316890 A1 Nov. 2, 2017

Related U.S. Application Data

(62) Division of application No. 14/830,901, filed on Aug. 20, 2015, now Pat. No. 9,934,912.

(51) Int. Cl.
| | |
|---|---|
| H01G 11/78 | (2013.01) |
| H01G 11/82 | (2013.01) |
| H01G 11/14 | (2013.01) |
| H01G 11/46 | (2013.01) |
| H01G 11/26 | (2013.01) |
| H01G 11/48 | (2013.01) |
| H01G 9/02 | (2006.01) |
| H01G 11/56 | (2013.01) |

(Continued)

(52) U.S. Cl.
CPC .............. *H01G 11/78* (2013.01); *H01G 9/04* (2013.01); *H01G 11/14* (2013.01); *H01G 11/26* (2013.01); *H01G 11/46* (2013.01); *H01G 11/48* (2013.01); *H01G 11/56* (2013.01); *H01G 11/82* (2013.01); *H01G 11/84* (2013.01); *Y02E 60/13* (2013.01)

(58) Field of Classification Search
CPC .......... H01G 9/04; H01G 11/78; H01G 11/14; H01G 11/26; H01G 11/46; H01G 11/48; H01G 11/56; H01G 11/82; H01G 11/84
See application file for complete search history.

(56) References Cited

U.S. PATENT DOCUMENTS 9,934,912 B2 * 4/2018 Zhi ........................ H01G 11/78

OTHER PUBLICATIONS

Wang, et al., "A Mechanically and Electrically Self-Healing Supercapacitor" Adv. Mater. 2014, 26, pp. 3638-3643, (2014).

(Continued)

*Primary Examiner* — Seahvosh Nikmanesh
(74) *Attorney, Agent, or Firm* — Renner Kenner Greive Bobak Taylor & Weber

(57) ABSTRACT

A repairable electrical component includes one or more electrodes and a pliable casing, the one or more electrodes positioned within the pliable casing, wherein the repairable electrical component is configured to self-repair if the repairable electrical component or any part of the repairable component is partially damaged. A method of forming a repairable electrical component includes forming one or more electrodes, the electrodes comprising a core, an intermediate layer of ferromagnetic material and a pyrrole based material defining an outer layer, the outer layer encapsulating the core and ferromagnetic layer, positioning the one or more electrodes within an electrolyte, providing a casing to enclose the one or more electrodes and the electrolyte, the casing formed from a polyurethane material.

6 Claims, 7 Drawing Sheets

(51) Int. Cl.
*H01G 9/04* (2006.01)
*H01G 11/84* (2013.01)

(56) References Cited

OTHER PUBLICATIONS

Sun, et al., "Self-Healable Electrically Conducting Wires for Wearable Microelectronics" Angew.Chem., Int. Ed. 2014, 53, pp. 9526-9531 (2014).

* cited by examiner

REPAIRABLE ELECTRICAL COMPONENT

TECHNICAL FIELD

The present disclosure relates to an electrical component or device, in particular the present disclosure relates to a repairable or restorable electrical component or device that is configured to self-repair or self-heal if the electrical component or device is at least partially damaged.

BACKGROUND

Electrical components are common place in the modern world, and are used in a wide variety of different industries and applications. Some examples of electrical components are wires, capacitors, inductors, transistors and resistors. Electrical components are used in a wide range of applications, and such electrical components can be subjected to different stresses due to mechanical forces such as bending or local deformation.

These electrical components can be damaged due to the stresses subject to the electrical components. The damage can comprise the performance or function of the electrical components and can comprise operation of a system including these electrical components.

The damaged electrical components would require repair or replacement which can be costly and time consuming. In some instances the electrical components can be used in applications where damage to the electrical components can be potentially risky to human life, such as for example in life support equipment.

SUMMARY OF THE INVENTION

The present disclosure generally relates to a repairable electrical component that can self-repair if the electrical component is partially damaged, or an electrical component that can provide the public with a useful alternative.

In accordance with a first aspect the present disclosure relates to a repairable electrical component, the electrical component comprising: one or more electrodes, a pliable casing, the one or more electrodes positioned within the pliable casing, wherein the repairable electrical component is configured to self-repair if the repairable electrical component or any part of the repairable component is partially damaged.

In some embodiments the electrical component is configured to mechanically self-repair and electrically self-repair if the electrical component is partially damaged. In some embodiments the pliable casing is configured to mechanically self-repair to restore integrity of the casing if the casing is partially damaged, the one or more electrodes configured to electrically self-repair to restore electrical conductivity if the one or more electrodes are partially damaged.

In some embodiments the one or more electrodes comprise a ferromagnetic material, the ferromagnetic material providing the one or more electrodes with magnetic properties such that if an electrode is partially damaged or broken, the electrode can self-align by magnetic attraction.

In some embodiments the electrical component comprises two electrodes arranged within the pliable casing.

In some embodiments the two electrodes are arranged in a helical arrangement, the two electrodes being spaced from each other in the helical arrangement.

In some embodiments the one or more electrodes comprising a metal core, a layer of the ferromagnetic material disposed on top of the metal core and an outer layer encasing the ferromagnetic material between the metal core and outer layer. In some embodiments the outer layer comprises polypyrrole material.

In some embodiments the metal core comprises a plurality of fibres, the fibres being intertwined to form a unitary structure.

In some embodiments the fibres are formed from any one of or an alloy of: steel, stainless steel, aluminium, copper.

In some embodiments the ferromagnetic material comprises iron oxide.

In some embodiments the casing comprises polyurethane based material.

In some embodiments the casing is formed from polyurethane or a carboxylated polyurethane.

In some embodiments the casing is configured to self-repair by reformation of electrostatic bonds between adjacent portions of the casing.

In some embodiments the casing is configured to self-repair by electrostatic attraction to restore the physical structure of the casing.

In some embodiments the electrical component comprises an electrolyte material disposed within the casing and between the electrodes, the electrolyte material functioning as a separator between the electrodes.

In some embodiments the electrolyte material is gel material formed of polyvinyl alcohol phosphoric acid gel.

In accordance with a second aspect the present disclosure relates to a repairable electrical component comprising: one or more electrodes comprising a magnetic material and an electrically conductive material, a pliable casing comprising a polymer material, the one or more electrodes arranged in the pliable casing, the electrical component configured to self-repair if the electrical component is partially damaged, wherein the self-repair comprises repair of the one or more electrodes by magnetic attraction to restore an electrical function of the one or more electrodes and repair of the pliable casing by electrostatic attraction to restore a physical structure of the pliable casing.

In some embodiments the present disclosure relates to a self-healing capacitor device.

In accordance with a third aspect the present disclosure provides a method of forming a repairable electrical component, the method comprising the steps of: forming one or more electrodes, the electrodes comprising a core, an intermediate layer of ferromagnetic material and a pyrrole based material defining an outer layer, the outer layer encapsulating the core and ferromagnetic layer, positioning the one or more electrodes within an electrolyte, providing a casing to enclose the one or more electrodes and the electrolyte, the casing formed from a polyurethane material.

In some embodiments the electrical component comprises a pair of electrodes positioned spaced apart from each other in a helical arrangement. In some embodiments the step of forming the electrode comprises the additional steps of: twist drawing a plurality of fibres to form the core, forming the intermediate layer of ferromagnetic material on the core by applying a microwave assisted hydrothermal process, annealing the core comprising the ferromagnetic material layer to anchor the ferromagnetic material to the core to define the ferromagnetic layer, electrodepositing the pyrrole based material on the ferromagnetic layer to define the outer layer.

In some embodiments the step of positioning the one or electrodes comprises the additional steps of: wrapping the one or more electrodes with an electrolyte gel, the electrolyte gel comprising a polyvinyl alcohol phosphoric acid gel, drying the electrolyte gel under a vacuum In some embodiments the step casing is a carboxylated polyurethane material, the casing being formed by a moulding process.

In some embodiments the core is formed from stainless steel fibres, the ferromagnetic material is an iron oxide and the outer layer is formed from a polypyrrole material.

In accordance with a fourth aspect the present disclosure relates to a repairable electrical component comprising: at least a pair of electrodes, the electrodes including a stainless steel core, the electrodes further including a layer of ferromagnetic material provided on the core defining an intermediate layer and pyrrole based material defining an outer layer, the outer layer encasing the core and the intermediate layer, a polyvinyl alcohol phosphoric acid gel electrolyte disposed between the pair of electrodes, a polyurethane casing surrounding the electrodes and electrolyte.

In some embodiments the stainless steel core functioning as a charge collector, the core being formed from a plurality of intertwined fibres, the core being formed by twist drawing the plurality of fibres to form a unitary structure.

In some embodiments the electrical component being self-repairable, the electrodes configured to self-repair to restore electrical and electrochemical functionality, the electrode self-repair being facilitated by the magnetic attraction due to the ferromagnetic material.

In some embodiments the pyrrole based material is a polypyrrole, the polypyrrole functions as the electrochemical active material, the polypyrrole material being electrodeposited on the intermediate layer to define the outer layer, the polypyrrole material outer layer reducing the damage to the intermediate layer or the core, the outer layer further preventing the ferromagnetic material being ripped off the core.

In some embodiments the casing comprising a carboxylated polyurethane material, the casing configured to self-heal in the presence of damage by restoring electrostatic bonds between adjacent portions of the casing.

In some embodiments the polyvinyl alcohol phosphoric acid gel electrolyte is configured to act as a separator between the electrodes, the polyvinyl alcohol phosphoric acid gel electrolyte is configured to provide some degree of self-adhering.

In some embodiments the supercapacitor is self-repairable such that the specific capacitance is greater than at least 40 $Fcm^{-2}$ after at least three self-healing cycles.

In some embodiments the supercapacitor is self-repairable such that a capacitance retention ratio is at least 70% after a fourth self-healing cycle.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIG. 3a illustrates the self-healing process of the self-repairable electrical component, in particular FIGS. 3a-3d illustrate the self-healing process occurring in the electrodes of the self-repairable electrical component.

FIG. 3b illustrates the self-healing process of the self-repairable electrical component, in particular FIGS. 3a-3d illustrate the self-healing process occurring in the electrodes of the self-repairable electrical component.

FIG. 3c illustrates the self-healing process of the self-repairable electrical component, in particular FIGS. 3a-3d illustrate the self-healing process occurring in the electrodes of the self-repairable electrical component.

FIG. 3d illustrates the self-healing process of the self-repairable electrical component, in particular FIGS. 3a-3d illustrate the self-healing process occurring in the electrodes of the self-repairable electrical component.

DETAILED DESCRIPTION OF THE PREFERRED EMBODIMENT

Figure 1:
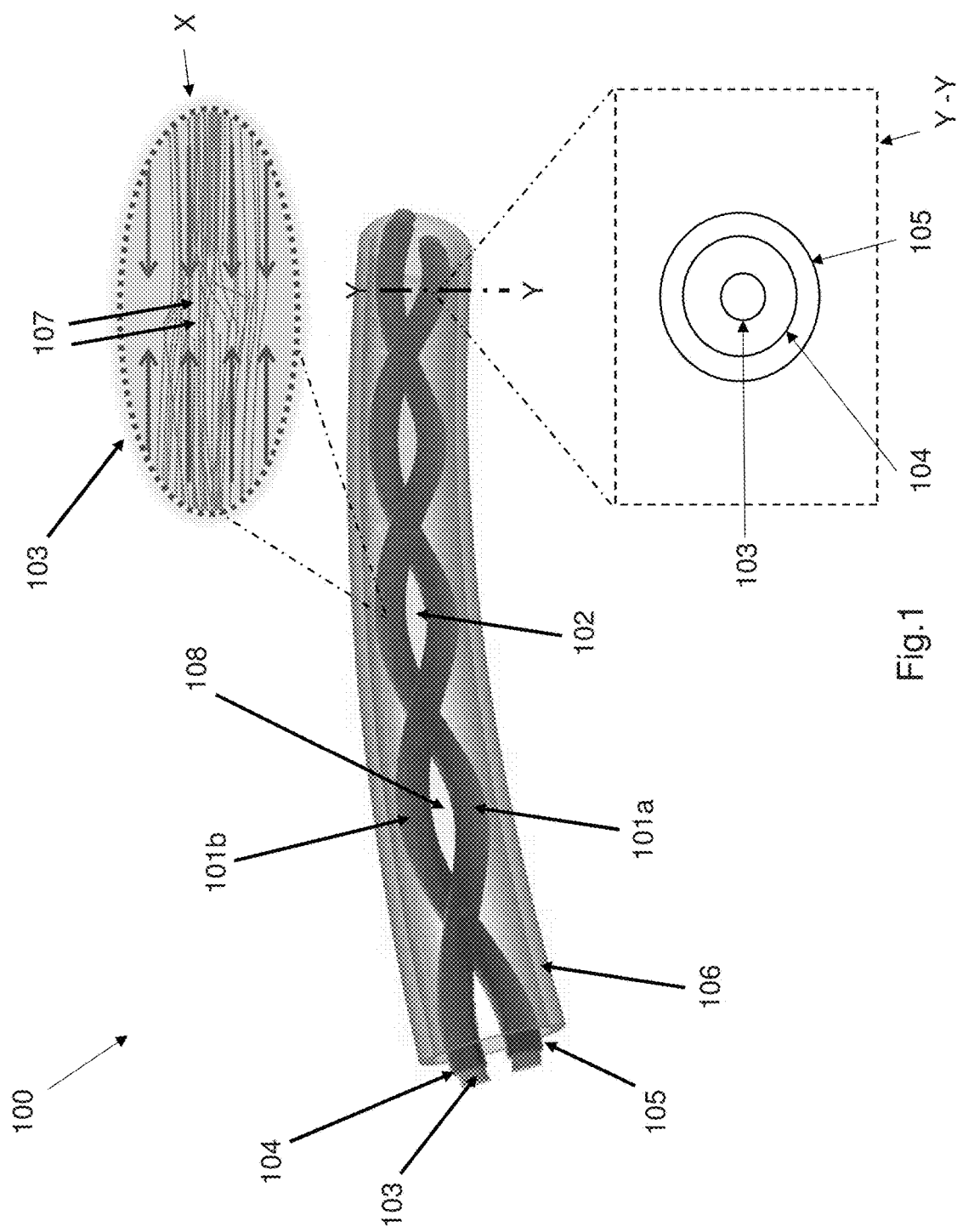
FIG. 1 is a diagram showing repairable electrical component, specifically a self-repairable electrical component.

Electrical or electronic components are ubiquitous in the modern world and are used in a wide variety of operations. Electrical components such as capacitors, supercapacitors, wires, resistors, transistors and inductors are some examples of electrical components used today. The term electrical component and electronic components are terms that will be interchangeably used.

Wearable electrical or electronic devices are becoming more common. Wearable electronic devices refers to clothing and accessories incorporating computing capabilities or computing devices and advanced electronic technologies. Such wearable electronic devices can comprise a number of different electrical or electronic components. Some examples of wearable electronic devices are Smart Glasses, Smart Watches, Wearable cameras and other Smart clothing. Wearable energy storage devices are increasingly in demand due to the popularization of wearable electronic devices.

A supercapacitor or ultra-capacitor is an example of an energy storage device that is used in wearable electronic devices. Supercapacitors are high capacity capacitor with high capacitance values. Typical capacitance values are greater than 800 farads at 1.2 Volts. Supercapacitors typically store 10 to 100 times more energy per unit volume or mass than electrolytic capacitors. Supercapacitors can accept and deliver charge faster than batteries and typically can also tolerate more charge and discharge cycles than rechargeable batteries. Supercapacitors often used in some wearable electronic devices as a power source or as an energy storage element.

Supercapacitors have become a commonly used electrical component in wearable devices due to their high power density, fast rate of charge-discharge, and long cycle lifetimes. Supercapacitors have been miniaturized for use in wearable electronic devices. However, in their long life cycles, miniature supercapacitors can suffer from several stresses under bending and other deformations. Such stresses are a common problem for wearable electronic (and supercapacitors) during practical applications. These stresses during use, can cause permanent damage or mechanical failure over time. Often these stresses and mechanical failures or mechanical damage are unavoidable with wearable electronic devices. Such unavoidable failures limit the lifespan and reliability of the supercapacitors, resulting in malfunction of the whole wearable electronic device.

The present disclosure provides a repairable electrical component that can be used in a wide variety of operations for example in wearable electrical or electronic devices. The present disclosure further provides a repairable electrical component is configured to self-repair when damaged or partially damaged. The self-repairing restores the mechanical structure of the electrical component. The self-repairing further restores electrical functionality and/or electrochemical functionality resulting in longevity of the electrical component and hence the wearable electronic device. In an aspect the present disclosure relates to a repairable electrical component, the electrical component comprising one or more electrodes, a pliable casing, the one or more electrodes positioned within the pliable casing, wherein the repairable electrical component is configured to self-repair if the repairable electrical component or any part of the repairable component is partially damaged.

In a further aspect the present disclosure relates to a repairable electrical component comprising one or more electrodes comprising a magnetic material and an electrically conductive material, a pliable casing comprising a polymer material, the one or more electrodes arranged in the pliable casing, the electrical component configured to self-repair if the electrical component is partially damaged, wherein the self-repair comprises repair of the one or more electrodes by magnetic attraction to restore an electrical function and/or electrochemical function of the one or more electrodes and repair of the pliable casing by reformation of electrostatic bonds to restore a physical structure of the pliable casing.

FIG. 1 illustrates a repairable electrical component. In particular FIG. 1 illustrates a repairable supercapacitor 100. The supercapacitor 100 comprises a pair of electrodes 101a, 101b. The electrodes 101a, 101b are arranged in a helical or a double helix arrangement. The electrodes 101a, 101b are identical in each other in size and dimensions. The electrodes 101a, 101b have an identical length, diameter and width as each other. The electrodes 101a, 101b are sized and structured to flexible or pliable. The electrodes 101a and 101b are elongate.

In the illustrated embodiment of FIG. 1, the electrodes 101a, 101b comprise a circular cross section and the electrodes 101a, 101b are substantially cylindrical in shape. In alternative embodiments the electrodes 101a, 101b can comprise any suitable cross sectional shape. For example the electrodes 101a, 101b can comprise a rectangular, oval, triangular, elliptical or trapezoid shaped cross section. In alternative embodiments the supercapacitor 100 can comprise more than two electrodes.

The electrodes 101a, 101b are spaced from each other, with a space 102 between the two electrodes 101a, 101b. The electrodes 101a, 101b comprise multiple layers. In the illustrated embodiment of FIG. 1, the electrodes 101a, 101b comprise three layers.

The electrodes 101a, 101b comprise a core 103 formed from a metal, the core 103 forming the inner most or first layer. The metal can be any suitable electrically active or electrically conductive metal for example steel, stainless steel, aluminium or copper. Preferably the core 103 comprises stainless steel.

The electrodes 101a, 101b further comprise an intermediate or second layer 104 of ferromagnetic material disposed on the core. The ferromagnetic material can be formed any magnetically active material. Preferably the ferromagnetic material comprises iron oxide ($Fe_3O_4$). The iron oxide (also known as magnetite) is preferably used since it exhibits ferrimagnetic properties i.e. magnetic properties. The ferromagnetic material may alternatively comprise ferrous oxide or ferric oxide. The ferromagnetic material is disposed on top of the metal core 103. The ferromagnetic material is formed as micro-particles or nano-particles. As illustrated in FIG. 1, the ferromagnetic material forms a layer 104 of ferromagnetic material on top of the metal core 103. The layer of ferromagnetic material 104 surrounds the metal core 103. The term ferromagnetic covers ferrimagnetic and ferromagnetic properties. The term ferromagnetic refers to a material exhibiting magnetic properties.

The electrodes 101a, 101b further comprise an outer or third layer 105 formed from a polymer. In the embodiment of FIG. 1, the outer layer 105 comprises a pyrrole based conductive polymer. The outer layer 105 preferably comprises a polypyrrole material such as polyacetylene. The polypyrrole layer 105 encapsulates the core 103 and the ferromagnetic layer 104. The polypyrrole layer 105 encapsulates or encloses inner layers 103, 104, such that damage to these inner layers is minimized. The polypyrrole used to create the outer layer 105 is electrically active and is arranged to sustain an electrical charge. In some embodiments the polypyrrole layer 105 may further be arranged to conduct electricity. The conductive polymer layer functions as an active layer in the supercapacitor 100. The pyrrole based conductive polymer can be formed as a porous layer to create a larger surface area for the electrode, to allow the electrode 101a, 101b to hold a larger amount of electrical charge. The outer layer 105 prevents the ferromagnetic material from being damaged and prevents the ferromagnetic material particles from being removed or ripped off the electrodes in use.

The electrodes 101a, 101b are positioned within a casing 106. In the illustrated embodiment the casing 106 is a pliable or flexible casing. The casing 106 is made of a polymer material such as a urethane based material or a plastics material. The casing 106 is formed from a polyurethane in the illustrated embodiment as per FIG. 1.

The panel labelled X, shown in FIG. 1, illustrates a detailed view of the electrodes 1012, 101b. The panel labelled X illustrates a zoomed in view of the metal core of the electrode. Each electrode comprises a plurality of fibres 107. In particular the core 103 of each electrode 101a, 101b comprises a plurality of fibres 107. The fibres 107 are formed from a metallic material. The fibres 107 are tightly packed together to define the solid body of the core 103. The fibres 107 are preferably twisted into a yarn that defines the core 103. In the embodiment of FIG. 1, the fibres are tightly packed together and twisted to form a unitary yarn structure. The electrode, in particular the core 103, comprises a unitary structure formed by packing together the plurality of fibres 107. The fibres 107 are preferably twisted together across the longitudinal axis of the electrode, to form a braided structure. The plurality of fibres 107 are formed such that the electrode is flexible along at least a longitudinal axis. The twisted fibres 107 form a unitary, intertwined structure that is flexible along the longitudinal axis and mechanically robust.

The fibres 107 are elongate in shape. The fibres 107 comprise a circular cross section and are generally cylindrical in shape. The fibres 107 are flexible along their own longitudinal axis. The fibres are less than 20 micrometers in diameter. Preferably the diameter of the fibres is less than 15 micrometers. The diameter of the core 103 is formed based on the size of supercapacitor or electrical component required.

The panel labelled Y-Y, shown in FIG. 1, illustrates a cross sectional view of the electrode as per the illustrated embodiment of FIG. 1. The cross section is taken along line Y-Y. The cross sectional view, of the illustrated embodiment, shows the three layers 103, 104, and 105 of the electrode. In the illustrated embodiment the second layer 104 of ferromagnetic material is disposed on the outer surface of the core 103. In the embodiment shown in FIG. 1, the core 103 comprises a plurality of fibres 107 interweaved into a braided structure. The ferromagnetic material 104 is positioned on the outer surface of the fibres positioned on the outer region of the unitary structure defining the core 103. As shown in FIG. 1, the layer of ferromagnetic material 104 is thicker than the outer layer 105, of the conductive polymer. The ferromagnetic layer 104 is the thickest layer to provide greater magnetic attraction along the core 103, to maintain structural integrity of the core. In the illustrated embodiment each layer has a constant thickness. However in alternate embodiments each layer may have a varying thickness around the circumference of the core 103.

In an alternate embodiment the ferromagnetic material can be disposed on each fibre 107. The ferromagnetic material can be deposited on each fibre 107 by any suitable process. The ferromagnetic material forms an intermediate layer on each fibre 107. In this alternative embodiment the pyrrole based polymer is further deposited on each fibre 107, The pyrrole based conductive polymer is positioned over the ferromagnetic material to define an outer layer of each fibre 107. The conductive polymer encapsulates the ferromagnetic material on each fibre 107. The fibres 107 are formed from stainless steel.

The ferromagnetic material layer 104 provides magnetic properties to the core 103 and fibres 107. In particular the ferromagnetic layer 104 provides magnetic attraction if the core or fibres are damaged. The presence of the ferromagnetic layer 104 in the core causes adjacent portions of the core 103 and fibres 107 to be attracted to each other by a magnetic force, if there is a break in the core or fibres 107. The magnetic attraction provides the core 103 with self-repair capability to restore electrical function and electrical conductivity of the core 103 or fibres 107.

The supercapacitor 100 further comprises a separator material 108 that is disposed within the space 102. The separator material 108 comprises a phosphoric acid compound. As per the illustrated embodiment in FIG. 1, the separator material 108 comprises a polyvinyl alcohol (PVA) phosphoric acid gel. The separator material 108 functions as a separator and an electrolyte between the two electrodes 101a, 101b. The PVA phosphoric acid gel further acts as an electrical insulator. The PVA phosphoric acid gel can be solid and can be self-adhering in use. In operation the electrodes 101a, 101b are charged by a current supply for example from a battery or other electrical components. When the electrodes 101a, 101b are charged, the charges are carried by the core 103 of the electrode. The fibres 107 all act as individual charge carriers. When the electrodes 101a, 101b are charged, opposite charge forms on either electrode 101a, 101b i.e. on either side of the separator material 108, creating an electric double layer.

The thickness or size of the separator material 108 and the size of the space 102 can be any suitable size subject to the functional requirements of the supercapacitor 100. The PVA phosphoric gel 108 comprises the ability to mechanically self-heal if the separator material 108 is damaged. The self-healing or self-repairing of the separator material 108 is achieved by re-establishment of electrostatic bonds such as hydrogen bonds between two damaged portions of the separator material 108. In the illustrated embodiment the supercapacitor 100 is a substantially cylindrical in shape. The electrodes 101a, 101b and casing 106 are of a cylindrical shape. The casing 106 comprises a urethane based material. Preferably the casing 106 is formed from a carboxylated polyurethane material. The casing 106 is substantially pliable such that the supercapacitor 100 is at least flexible along its longitudinal axis. The carboxylated polyurethane material of the casing 106 provides the casing self-repair ability to restore mechanical and structural integrity if the casing 106 is damaged.

The supercapacitor 100 is self-repairable if a portion of the supercapacitor 100 is damaged or partially damaged. The magnetic material 104 allows self-repair of the core 103 by magnetic attraction, the separator material 108 and casing 106 self-repair by re-establishing electrostatic bonds to restore structural integrity of the casing 106 and separator material 108.

Figure 2:
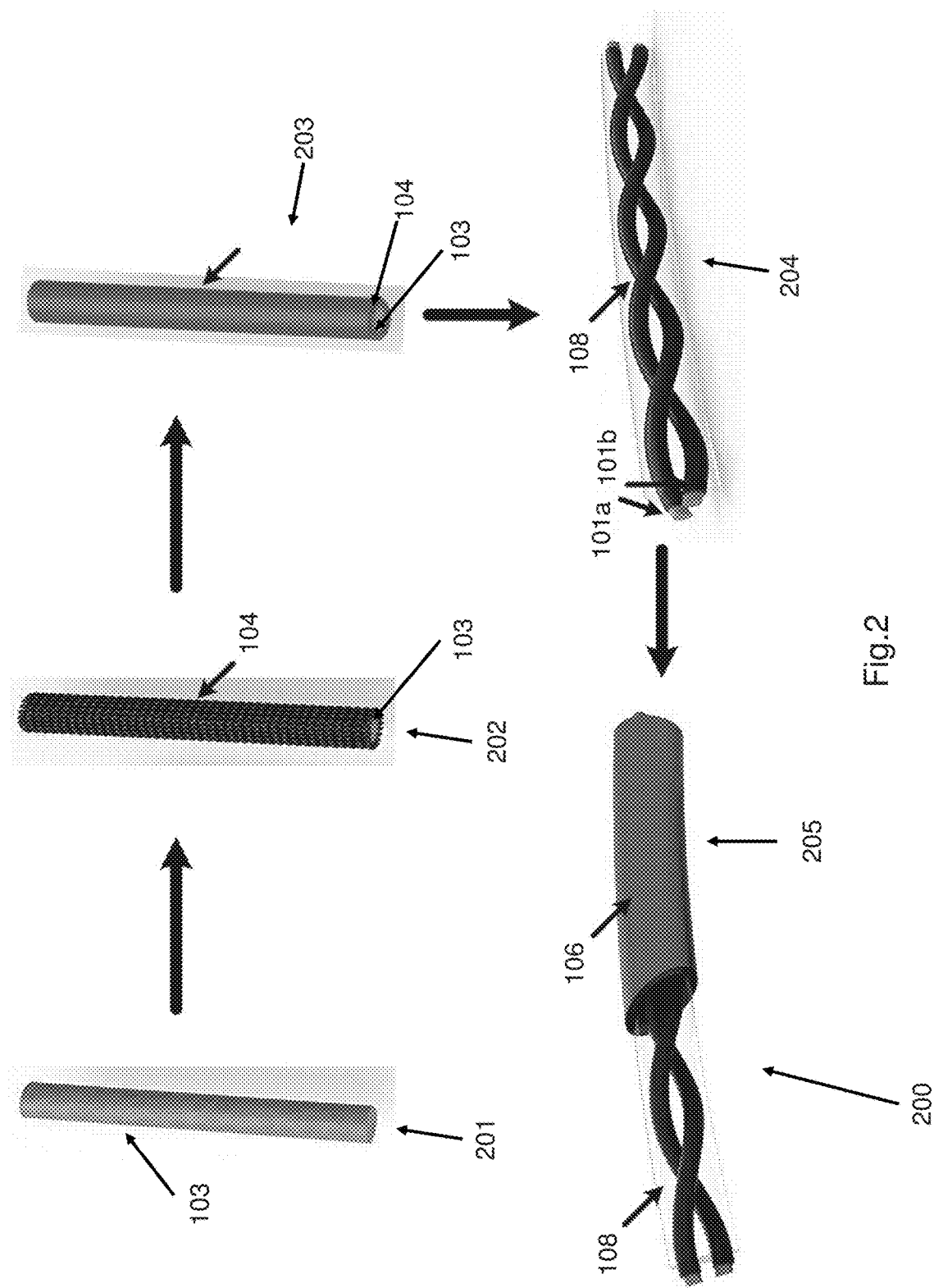
FIG. 2 shows schematic of an exemplary method of forming the self-repairable electrical component.

FIG. 2 shows a schematic diagram of a method of forming the supercapacitor 100. FIG. 2 shows a graphic representation of one exemplary process flow to create a repairable electrical component, the electrical component being a supercapacitor 100 in the illustrated embodiment.

Referring to FIG. 2, step 201 comprises creating a core 103. The core 103 is formed by intertwining a plurality of stainless steel fibres into a unitary structure. The fibres 107 are twisted together to form a yarn based core 103. The core 103 is formed by a twist drawing technique that twists together the fibres 107 to form the core 103, The core 103 can optionally be cleaned using any cleaning process to prepare the core surface 103 for receiving the ferromagnetic layer.

At step 202, the ferromagnetic material layer 104 is created on the core 103 by growing the ferromagnetic layer 104 on the core. In the illustrated embodiment, the core 103 undergoes a microwave-assisted hydrothermal process to create magnetite crystals ($Fe_3O_4$) on the core 103. The ferromagnetic layer comprises the magnetite particles. The magnetite particles are nano-particles. The magnetite particles are formed as crystals. The microwave assisted hydrothermal process is controlled to grow an appropriate amount of magnetite crystals on the core 103. As can be seen in the illustrated embodiment the surface texture and colour of the core 103 changes in colour as the magnetite crystals grow on the core 103. The core 103 is annealed to anchor the magnetite crystals to the stainless steel core 103. The core 103 is annealed at least 220 degrees Celsius for at least 45 minutes. More preferably the core 103 with magnetite crystal layer 104 is annealed at 250 degrees Celsius for 60 minutes. The annealing process can be performed at other temperature ranges and for other suitable time ranges. The surface of the core 103 has a rough finish once the magnetite particles are formed on the core 103.

At step 203, the outer layer 105 of polypyrrole is created. The polypyrrole material is deposited on the annealed core 103 by an electro-deposition process. Any suitable electro-deposition process can be used to apply the polypyrrole to the annealed core 103. The electro-deposition process is controlled to achieve a desired thickness of polypyrrole material. Preferably the polypyrrole is electro-deposited such that a 2 micrometer thick layer of polypyrrole is formed on the annealed core 103, The polypyrrole is electrodeposited to encase the core 103 and the ferromagnetic material layer 104, such that the ferromagnetic material is retained on the core 103. The polypyrrole material tightly wraps the magnetite particles. The tightly wrapped polypyrrole forms a protective layer or a shell that prevents the magnetite particles from being dislodged during use of the supercapacitor 100. In some examples or embodiments the electro-deposition process can be controlled to achieve a porous layer of polypyrrole. Following the deposition of the polypyrrole material, the surface of the electrode is smoother than after the positioning of the magnetite particles.

At step 204, two electrodes 101a, 101b are positioned spaced from each other and arranged in a helical arrangement. The electrodes 101a, 101b are formed using steps 201-203 described above. The electrodes 101a, 101b are wrapped with a separator material 108. The electrodes 101a, 101b are wrapped with a polyvinyl alcohol (PVA) phosphoric acid gel 108. The PVA phosphoric gel 108 acts as an electrolyte and a separator between the electrodes 101a, 101b, The PVA phosphoric gel is cured to achieve the required mechanical properties. The electrodes 101a, 101b are set within the separator material 108.

Figure 3:
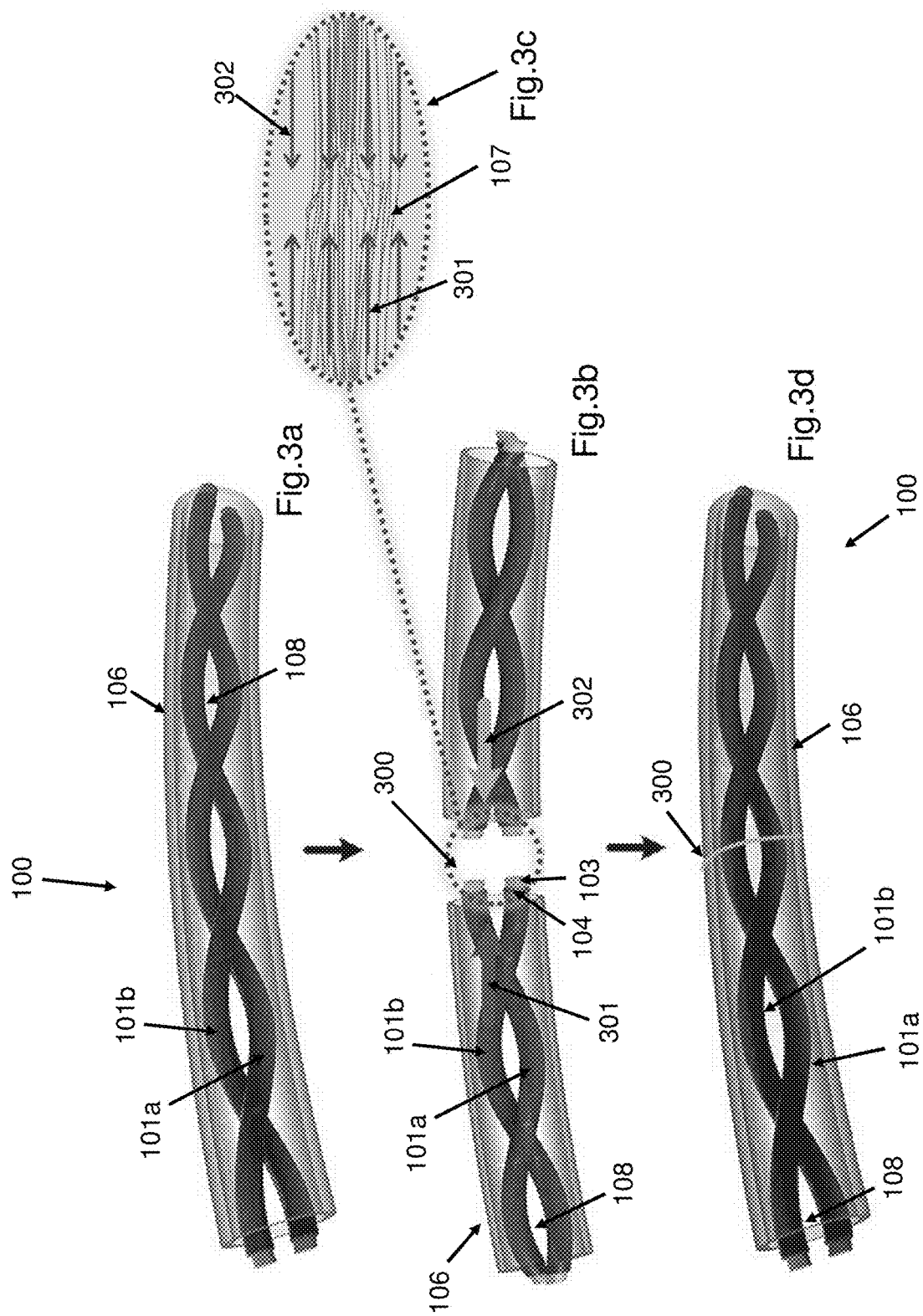

At step 205, the casing 206 is formed over the electrodes 101a, 101b and the separator material 108. The casing 206 is formed on the outer surface of the separator material 108. The casing 206 is formed of a pliable material that is compatible for use with fabrics or compatible for use with wearable electronic devices. In the illustrated embodiment the casing 206 is formed from a urethane material. Preferably the casing 106 is formed from a polyurethane material. Even more preferably the casing 106 is formed from a carboxylated polyurethane. The casing 106 is formed over the outer surface of the separator material 108 via dropcasting method. Alternatively any suitable moulding operation can be used such as co-moulding or over-moulding. FIGS. 3a, 3b 3c and 3d show an illustration of the self-healing process that the electrodes 101a, 101b if there is damage to the electrodes 101a, 101b. Referring to FIG. 3a, shows an undamaged supercapacitor 100. FIG. 3a shows an elongate shaped supercapacitor 100 with a pair of helically arranged electrodes 101a, 101b positioned within a casing 106 and the electrodes being separated by a separator material 108.

FIG. 3b, shows a damaged supercapacitor 100. As described above electrical and electronic components used in wearable devices are subjected to several stresses and strains that can cause damage. The example in FIG. 3b shows a supercapacitor 100 where the outer casing and electrodes 101a, 101b have been broken due to shear. FIG. 3b shows a break in the core 103 of the electrodes 101a, 101b. FIG. 3c shows a detailed view of the damaged core 103. FIG. 3c shows the fibres 107 have been damaged and broken due to the forces on the supercapacitor 100. The break is shown as feature 300 in FIGS. 3b and 3d. The break can be any type of break subject to the forces experienced by the supercapacitor 100. The illustrated example the break 300 is a complete break of the supercapacitor 100. The break 300 comprises shearing of the casing 106 and the two electrodes 101a, 101b. The break 300 can be a partial break of the casing 106 or electrodes 101a, 101b.

The electrodes 101a, 101b comprise an intermediate layer 104 of ferromagnetic material. The presence of the ferromagnetic material cause magnetic attraction between the broken parts of the core 103. Arrows 301 and 302 illustrate the magnetic attraction between the broken portions of the core 103. FIG. 3c illustrates the magnetic attraction between the fibres 107. The magnetic attraction 301, 302, due to the ferromagnetic material layer 104 causes the cores 103 (and fibres 107) to align with each other. The magnetic attraction 301 and 302 causes the fibres 107 to reconnect to each other and reform the core 103. The magnetic attraction causes the broken parts of the core 103 to reconnect to each other and restore electrical connectivity. The magnetic attraction allows the electrodes 101a, 101b to electrically self-heal and restore electrical conductivity, electrical function and charge carrying capabilities of the electrodes 101a, 101b. The magnetic attraction causes alignment of the cores 103 and fibres 107 in complete breaks, such as break 300 or even in partial breaks.

FIG. 3d shows a repaired supercapacitor 100. As part of the repair the casing 106 is further configured to self-repair and restore the casing at the break 300. The separated parts of the casing 106 are attracted to each other by electrostatic attraction. The casing 106 is made from a material that restores electrostatic bonds such as hydrogen bonds between broken parts of the casing to restore the physical structure of the casing. Further details of the casing 106 and the self-repair process of the casing will be described with reference to FIGS. 4a to 4d.

The repair of the supercapacitor is a self-repair process because of the magnetic attraction in the electrodes and the electrostatic attraction in the casing 106. This repair is referred to as self-repair because the supercapacitor 100 repairs itself without any external stimuli to cause the repair. The self-repair will occur providing the broken parts are adjacent to each other. The self-repair process will occur as long as the broken parts of the repairable electrical component (i.e. supercapacitor 100 in the illustrated embodiment), are in proximity of each other such that the magnetic force attracts the broken parts of the electrode, and such that electrostatic bonds are able to be reformed.

Figure 4:
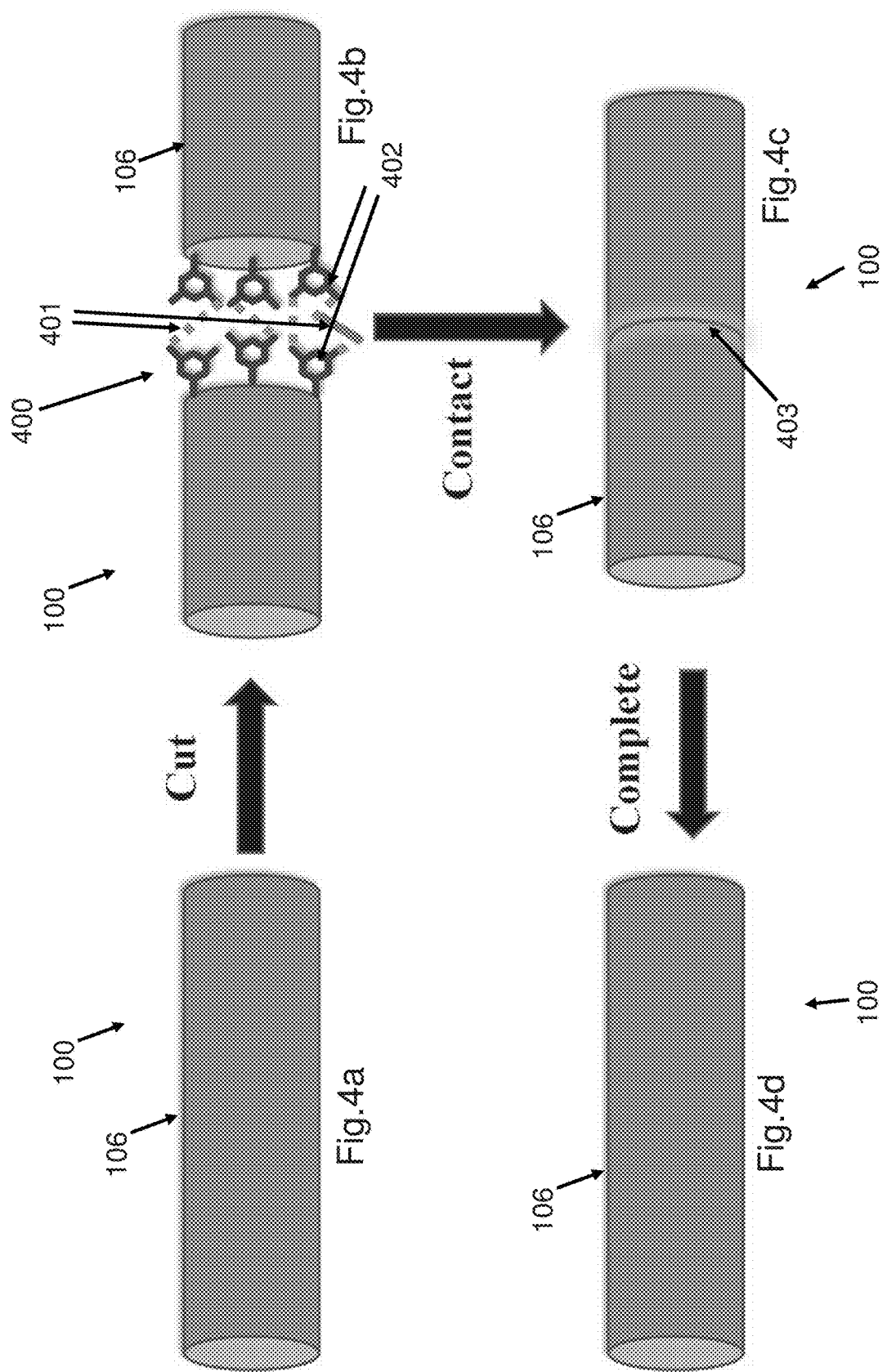
FIG. 4a illustrates the self-repair process of the casing of the self-repairable electrical component.
FIG. 4b illustrates the self-repair process of the casing of the self-repairable electrical component.
FIG. 4c illustrates the self-repair process of the casing of the self-repairable electrical component.
FIG. 4d illustrates the self-repair process of the casing of the self-repairable electrical component.

FIG. 4 shows a detailed illustration of the self-repair process for the casing 106 of the self-repairable electrical component, specifically within the supercapacitor 100. For ease of explanation the electrodes and the electrolyte gel is not illustrated in FIGS. 4a, 4b, 4c and 4d. The supercapacitor 100 is shown as a solid block of polyurethane material 106 for ease of explanation of the self-repairing function of the casing.

FIG. 4a shows an undamaged supercapacitor 100. FIG. 4a shows the casing being structurally unbroken. The casing 106 is made of a carboxylated polyurethane in the illustrated embodiment. FIG. 4b shows a damaged casing 106. The casing has been cut or broken or sheared due to forces on the supercapacitor 100 during use. The damaged area 400 is illustrated in FIG. 4b following the cut. When damaged the broken parts of the casing are reformed by electrostatic attraction.

In the illustrated example the casing 106 is formed of a carboxylated polyurethane material. The carboxylated polyurethane material organic chain units joined by a urethane link. The casing 106 comprises an assembly of supramolecules, that forms chains and cross links via reversible hydrogen bond acceptors and donors. When there is a break in the casing, the strong intermolecular hydrogen bonds are broken. The hydrogen bonds are referred to as electrostatic bonds and cause electrostatic attraction, During the self-repair process, the hydrogen bonds 401 are re-established between the two broken parts of the casing. In the illustrated example the hydrogen bonds are reformed between carboxyl groups 402 on corresponding broken parts. The adjacent carboxyl groups 402 are attracted together and re-form hydrogen bonds via the hydrogen bond acceptors and donors. The self-healing can be improved in some instances by adding water for example approximately 200 micro-liters of water can improve the self-repair of the casing 106.

FIG. 4c illustrates the casing 106 once healing of the damaged area 400 is completed. The two broken parts are brought together and re-form into a unitary structure due to the reformation of the hydrogen bonds. The two broken pieces can self-heal providing they are positioned substantially adjacent each other, such that the electrostatic attraction causes the broken parts to come together. The healed portion is illustrated as region 403. FIG. 4d illustrates an example of the casing once self-repair of the casing 106 is completed. The reformation of the electrostatic bonds via electrostatic attraction leaves minimal evidence of damage, i.e. there are minimal marks and minimal surface deformation once the self-repair process of the casing 106 is completed.

Figure 5:
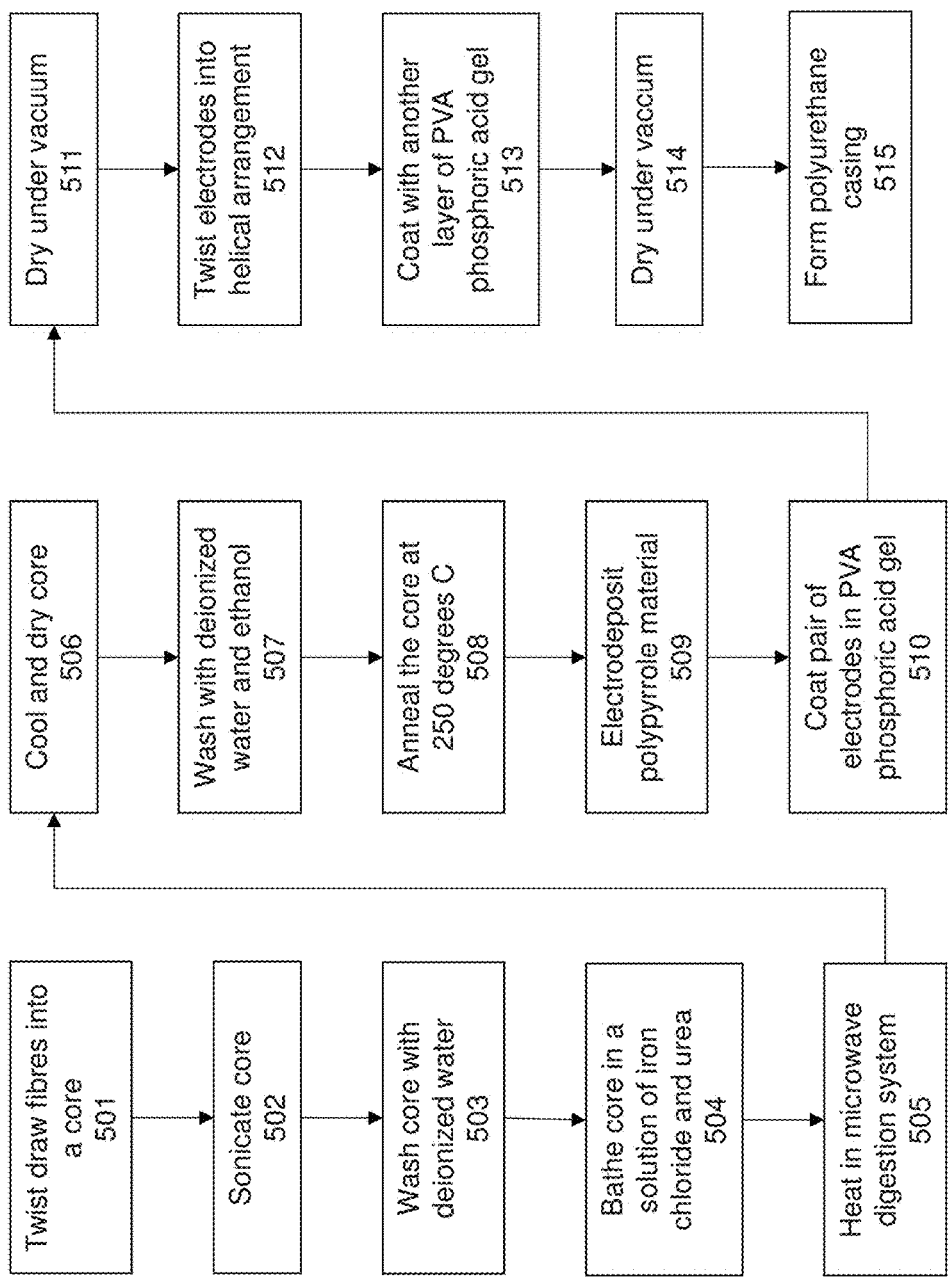
FIG. 5 illustrates a flow diagram for an exemplary method to fabricate the self-repairable electrical component.

FIG. 5 shows a further method 500 of fabricating the self-repairable electrical component. FIG. 5 shows a flow chart illustrating an example method of forming the self-repairable supercapacitor 100. The method of FIG. 5 is another exemplary method. At step 501, stainless steel fibres 107 are twist drawn into an intertwined core. The core (i.e. yarn) is drawn to an appropriate length, for example, the core is between 10 cm-15 cm. At step 502 the core is sonicated in acetone and methanol for at least 20 minutes. At step 503, the core is washed with de-ionized water following step 502. At step 504 the core is bathed in solution of Iron Chloride and Urea for at least 20 minutes but preferably for at least 30 minutes. In one example the solution is formed from 500 ml of Iron Chloride ($FeCl_2$) and 2.8 g of Urea. At step 505, following step 504, the core is placed in a microwave digestion system (such as for example a MDS-6G, made by Shanghai Sineo Microwave Chemistry Technology Co. Ltd), and heated at 160 degrees Celsius for at least 20 minutes, but preferably for 30 minutes. Step 505 can be one example of a microwave assisted hydrothermal method. Step 505 causes the growth of the ferromagnetic material, in this example the ferromagnetic material being magnetite. At step 506, the core is cooled to room temperature and dried. At step 507, the core is washed with deionized water and absolute ethanol to clean the core of any excess magnetite. At step 508, the core with the ferromagnetic material is annealed at 250 degrees Celsius under air flow for 60 minutes at a ramp rate of 5 degrees Celsius per minute. At step 509, the polypyrrole material is electrodeposited on the surface of the core over the top of the magnetite (i.e. ferromagnetic material). A constant voltage of 0.8 V is used during the deposition processes. The electrodepositing process comprises using a three electrode configuration, wherein the annealed core is the working electrode, a platinum wire is used as the counter electrode and a silver or silver chloride is used as a reference electrode. The polyprrole is wrapped tightly around the magnetite and stainless steel core to encapsulate the core and define an outer layer of the electrode.

Steps 501 to 509 define the process to form an electrode. A pair of electrodes are formed using the method steps of 501 to 509. Still referring to FIG. 5, the method moves to step 510. At step 510 the pair of electrodes are coated in a polyvinyl alcohol (PVA) phosphoric acid gel electrolyte. At step 511, the coated electrodes are dried under vacuum at room temperature. At step 512, the pair of electrodes are twisted into a helical arrangement. At step 513, following step 513, the helical electrode arrangement is coated with another layer of PVA phosphoric acid electrolyte gel. At step 514, the twisted electrode arrangement is dried under vacuum again. At step 515 the polyurethane casing is formed over the electrolyte gel. The supercapacitor 100 can be formed using the method 500 as described with reference to FIG. 5.

The repairable electrical component 100 as described is advantageous because it can self-repair when damaged to restore function and reducing the need to replace the component. The supercapacitor 100 as described with reference to the figures is advantageous because the core is formed from stainless steel fibres. The fibres provide good conductivity, corrosion resistance and thermal stability. The core 103 being formed from a plurality of fibres 107, tightly packed into a yarn or core also provide flexibility to the core 103. The flexible nature of the core, and hence the supercapacitor can be used in wearable electronics and be used with traditional fabrics. The core being formed from a plurality of fibres 107 also increases the surface area of the electrode and allows the electrode 101 to hold a larger amount of charge. This makes the supercapacitor useful in a wider range of implementations such as a wearable energy storage device or as a wearable power source.

The casing 106 being formed from a carboxylated polyurethane is advantageous because the casing is self-repairable. The self-repairing nature of the casing 106 is advantageous because the casing will restore its structure if the casing is damaged, Traditional supercapacitors generally do not comprise a carboxylated polyurethane casing, hence are not self-repairing. The self-repairing due to reforming electrostatic bonds between adjacent portions of the casing provides for restoring of mechanical properties such as tensile strength and young's modulus. The self-repair allows the mechanical properties to be substantially maintained after multiple self-repair cycles, resulting in a more robust casing and hence more robust electrical component.

The application of a ferromagnetic material to the fibres 107 and/or the core 103 assists in the self-repairing of the core 103. It is often too difficult to physically reconnect broken fibres or parts of a broken core accurately. Further in prior art supercapacitors if the core or part of the electrode is damaged the entire device needs to be replaced. The described supercapacitor 100 can reform connection between broken portions of the electrode due to magnetic attraction due to the presence of the ferromagnetic material (e.g. magnetite). The broken portions of the core or fibres are automatically re-aligned and reconnected. This is advantageous since the electrical functionality can be recovered after several healing cycles.

The combination of a self-repairable casing 106 and a self-repairable electrodes 101a, 101b function in combination to provide a self-repairable electrical component. The self-repairable electrical component provides a more robust component with a longer operational lifespan due to the self-repair characteristics.

Figure 6A:
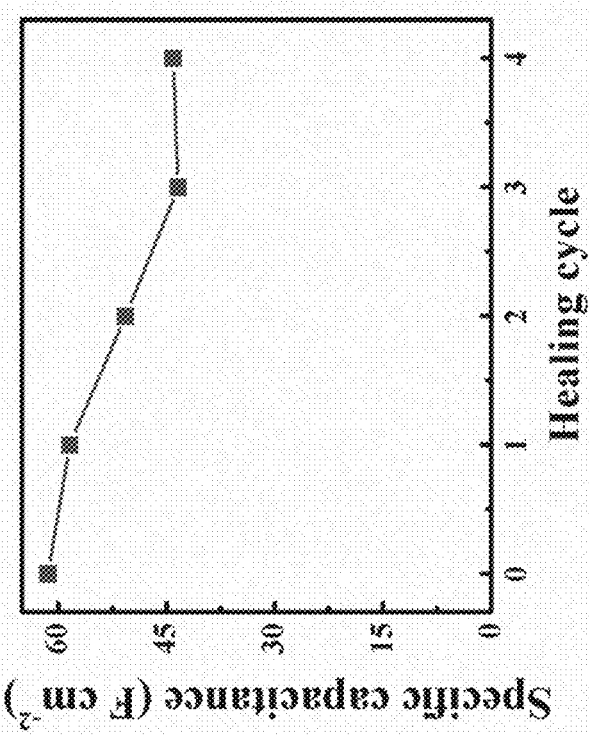
FIG. 6a shows experimental results from testing the performance of the supercapacitor in accordance with the present disclosure.

The supercapacitor 100 performance was tested by the inventors, specifically the inventors tested the supercapacitor 100 for a number of performance parameters. The inventors fabricated the supercapacitor 100 using the method 500 or another similar method, Following fabrication the inventors damaged the supercapacitor 100 by cutting it and tested various performance parameters following the self-repair of the supercapacitor. The inventors repeated the damaging and self-repair process multiple times and determined various performance parameters. FIGS. 6a and 6h illustrate test results for specific capacitance and capacitance retention of the supercapacitor following repeated damage and self-repair cycles.

Figure 6B:
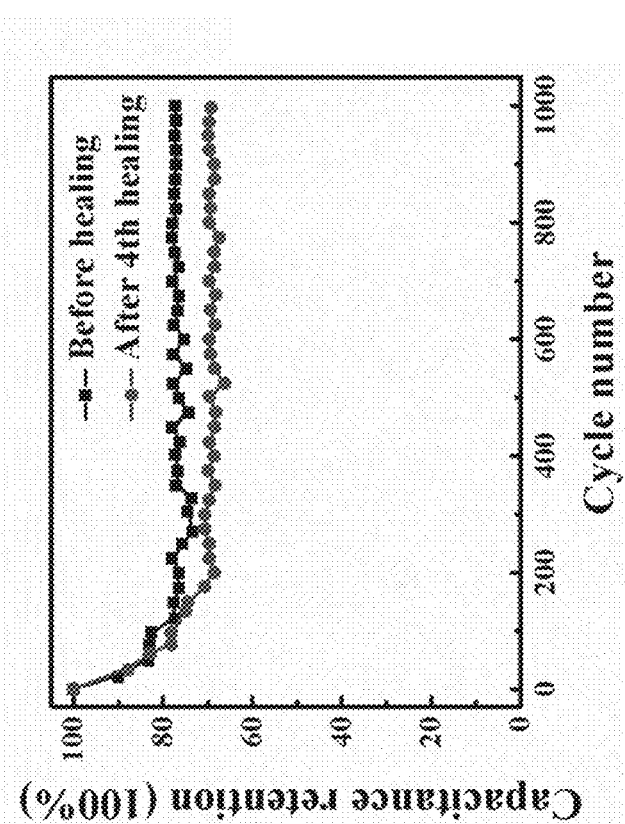
FIG. 6b shows experimental results from testing the performance of the supercapacitor in accordance with the present disclosure.

FIG. 6a shows a result of the specific capacitance determinations after numerous self-repair cycles. The capacitance of the electrode 101a, 101b is evaluated by galvanostatic charge/discharge tests at different current densities between 0V and 1V. The specific capacitance can be estimated from cyclic voltammetry curves in a voltage window from 0V to 1V. As can be seen from FIG. 6a, the specific capacitance after various self-repair (i.e. healing) cycles. The specific capacitance is approximately 60 mFcm$^{-2}$ at a scan rate of 10 mVs$^{-1}$. The specific capacitance reduces after 3 self-repair cycles and remains substantially constant after 4 self-repair cycles. It should be noted that after several cutting/healing the specific capacitance is still maintained at a high level. FIG. 6a shows that after 4 cutting/healing cycles the specific capacitance is still maintained at 44.1 mFcm$^{-2}$. FIG. 6b shows a plot of capacitance retention ratio. The capacitance retention ratio is maintained substantially constant for a number of charge/discharge cycles. FIG. 6b shows plots of the capacitance retention before damaging the supercapacitor 100 and the capacitance retention after a fourth healing cycle. The capacitance retention is determined for 1000 charge/discharge cycles. As can be seen from FIG. 6b the capacitance retention percentage is at a substantially high level after the fourth healing, but lower than the capacitance retention percentage for an undamaged supercapacitor 100. The capacitance retention percentage after a fourth damage/healing cycle is still approximately 70%. This is specific capacitance and capacitance retention percentage is high because the broken electrodes are self-repaired due to the magnetic attraction between broken portions of the electrodes. The self-healing ability of the casing also works synergistically with the electrical self-healing of the electrodes to provide an improved repairable electrical component.

Figure 7:
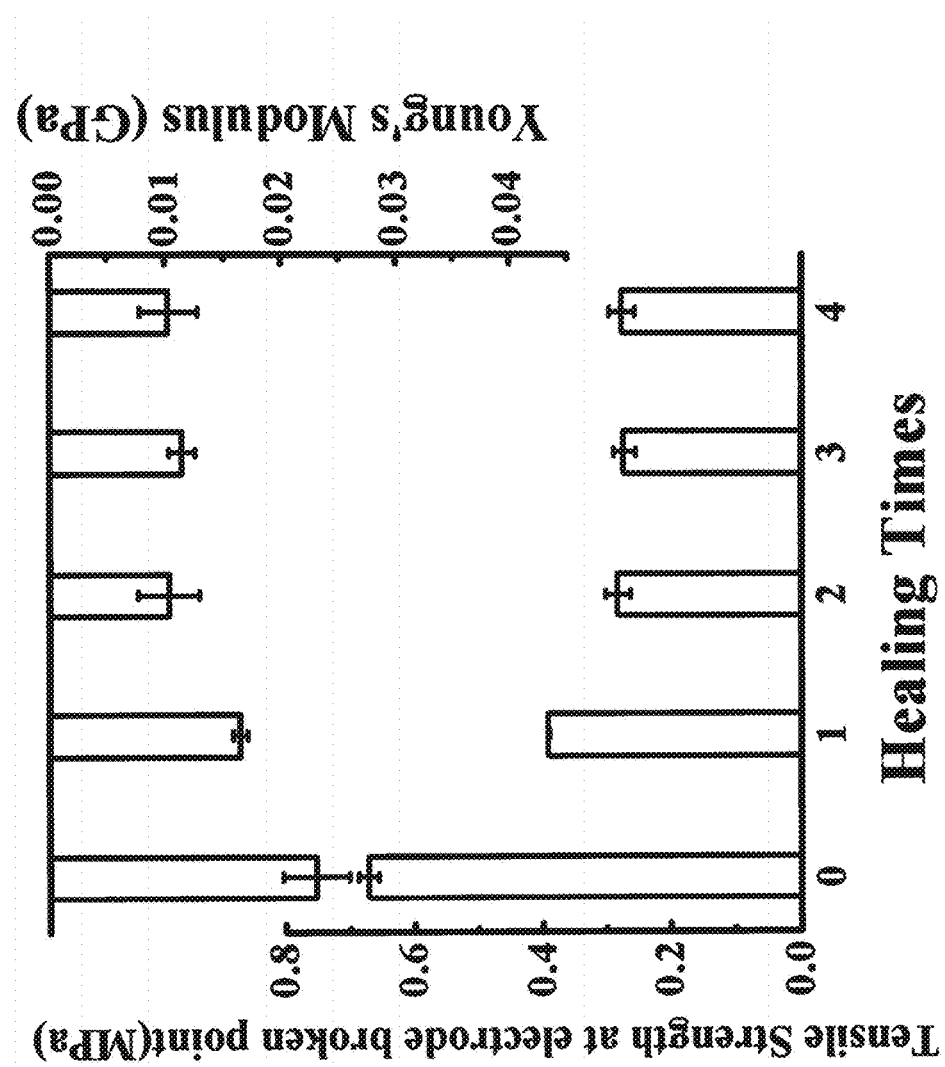
FIG. 7 illustrates experimental results of the mechanical properties of the supercapacitor in accordance with the present disclosure.

FIG. 7 shows the mechanical properties of the repairable supercapacitor 100 before and after healing cycles. The inventors conducted tests to determine mechanical properties of the supercapacitor 100 prior to breaking and after multiple damaging/healing cycles. As can be seen from 7 there is a sudden drop of mechanical properties (tensile strength and young modulus) after the first healing process. This is due to the strength difference between the electrode and the polyurethane casing. Before the cutting/healing cycles, the high Young's modulus and tensile strength are attributed to the high mechanical performance of the electrode while after the first cutting/healing cycle, the mechanical properties (i.e. at least tensile strength and young's modulus) are dominated by those of the casing. The magnetic attraction force assists in reconnection of the electrodes but only contributes to the mechanical properties in a limited manner. The inventors have determined that after the first breaking of the electrodes, the mechanical properties with different breaking/healing cycles are maintained due to the self-healing of the polyurethane casing. The results in FIG. 7 shows self-healing of the casing is occurring since the mechanical properties are maintained substantially constant after several breaking/healing cycles.

The following is a description of alternative embodiments of various features.

In an alternative embodiment the repairable electrical component is a conductor such as a wire. In a further alternative embodiment the repairable electrical component is an inductor or any other electronic component that comprises one or more electrodes. Electrode as described in this specification can refer to a component that can conduct electricity or can store an electrical charge. In alternative embodiments the repairable electrical component comprises a single electrode or a single conductor. The teachings in the present disclosure can be applied to create another suitable self-healing electrical component.

In an alternative embodiment the casing can be made from a thermoplastics material such as polystyrene, polyvinylchloride, polyethylene, nylon, polycarbonate or polypropylene or any suitable thermoplastics material that is pliable once formed. In a further alternative embodiment the casing can be formed from any suitable urethane based material that is substantially pliable in use. In an alternative embodiment the casing can be formed from a suitable plastics polymer such as a thermoplastic elastomer. In some embodiments the casing can be substantially rigid in use.

In alternative embodiments the ferromagnetic material can comprise iron, nickel or cobalt, or a combination or alloy thereof. In alternative embodiments the outer layer of the electrode can comprise any other suitable conductive polymer material such as polyaniline, polyphenylene vinylene or polythiophene. In a further alternative embodiment the outer layer 105 of the electrode can comprise another suitable conductive material such as a metal or metal alloy.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

The invention claimed is:

1. A method of forming a repairable electrical component comprising the steps of:
    forming one or more electrodes, the one or more electrodes comprising a core, an intermediate layer of ferromagnetic material and a pyrrole based material defining an outer layer, the outer layer encapsulating the core and ferromagnetic layer,
    positioning the one or more electrodes within an electrolyte,
    providing a casing to enclose the one or more electrodes and the electrolyte, the casing formed from a polyurethane material.

2. A method of forming a repairable electrical component in accordance with claim 1, wherein the electrical component comprises a pair of electrodes positioned spaced apart from each other in a helical arrangement.

3. A method of forming a repairable electrical component in accordance with claim 1, wherein the step of forming the one or more electrodes comprises the additional steps of:
    twist drawing a plurality of fibres to form the core, forming the intermediate layer of ferromagnetic material on the core by applying a microwave assisted hydrothermal process, annealing the core comprising the ferromagnetic material layer to anchor the ferromagnetic material to the core to define the ferromagnetic layer, electrodepositing the pyrrole based material on the ferromagnetic layer to define the outer layer.

4. A method of forming a repairable electrical component in accordance with claim 1, wherein the step of positioning the one or more electrodes comprises the additional steps of:

wrapping the one or more electrodes with an electrolyte gel, the electrolyte gel comprising a polyvinyl alcohol phosphoric acid gel, and, drying the electrolyte gel under a vacuum.

5. A method of forming a repairable electrical component in accordance with claim 1, wherein the casing is a carboxylated polyurethane material, the casing being formed by a moulding process.

6. A method of forming a repairable electrical component in accordance with claim 1, wherein the core is formed from stainless steel fibres, the ferromagnetic material is an iron oxide and the outer layer is formed from a polypyrrole material.

* * * * *